(12) United States Patent
Iwasawa et al.

(10) Patent No.: US 12,220,854 B2
(45) Date of Patent: Feb. 11, 2025

(54) LAMINATE, IN-MOLD LABEL, LABELED MOLDED BODY, ROLLED IN-MOLD LABEL, AND STACKED IN-MOLD LABELS

(71) Applicant: YUPO CORPORATION, Tokyo (JP)

(72) Inventors: Yuta Iwasawa, Ibaraki (JP); Shunsuke Honda, Ibaraki (JP); Masahiko Ueno, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 1147 days.

(21) Appl. No.: 17/041,656

(22) PCT Filed: Mar. 29, 2019

(86) PCT No.: PCT/JP2019/014046
§ 371 (c)(1),
(2) Date: Sep. 25, 2020

(87) PCT Pub. No.: WO2019/189782
PCT Pub. Date: Oct. 3, 2019

(65) Prior Publication Data
US 2021/0129410 A1    May 6, 2021

(30) Foreign Application Priority Data

Mar. 30, 2018 (JP) ................................. 2018-068638

(51) Int. Cl.
| | |
|---|---|
| G09G 3/02 | (2006.01) |
| B29C 49/24 | (2006.01) |
| G09F 3/02 | (2006.01) |
| G09F 3/10 | (2006.01) |
| C09J 7/35 | (2018.01) |
| C09J 7/40 | (2018.01) |

(52) U.S. Cl.
CPC ............... B29C 49/24 (2013.01); G09F 3/02 (2013.01); G09F 3/10 (2013.01); B29C 49/2408 (2013.01); B29C 2049/24306 (2022.05); C09J 7/35 (2018.01); C09J 7/405 (2018.01); C09J 2203/334 (2013.01); C09J 2301/312 (2020.08); G09F 2003/025 (2013.01); Y10T 428/2817 (2015.01); Y10T 428/2839 (2015.01); Y10T 428/2848 (2015.01)

(58) Field of Classification Search
None
See application file for complete search history.

(56) References Cited

U.S. PATENT DOCUMENTS

| | | | | |
|---|---|---|---|---|
| 5,308,699 A | * | 5/1994 | Hikasa ................ | C08L 23/16 525/193 |
| 2001/0028952 A1 | | 10/2001 | Nishizawa et al. | |
| 2003/0059593 A1 | * | 3/2003 | Sakaguchi .............. | B32B 27/32 428/476.3 |
| 2008/0280111 A1 | * | 11/2008 | Blackwell ............. | B29C 55/023 428/480 |
| 2010/0221534 A1 | | 9/2010 | Kumar et al. | |
| 2017/0140676 A1 | * | 5/2017 | Iwasawa ................. | B32B 27/32 |
| 2018/0036934 A1 | * | 2/2018 | Iwase ..................... | B32B 27/18 |

FOREIGN PATENT DOCUMENTS

| | | |
|---|---|---|
| CN | 1833876 A | 9/2006 |
| CN | 101035684 A | 9/2007 |
| CN | 102206467 | 10/2011 |
| CN | 102576502 | 7/2012 |
| CN | 103003232 | 3/2013 |
| CN | 106459680 | 2/2017 |
| CN | 106575491 | 4/2017 |
| CN | 106633143 | 5/2017 |
| EP | 1154005 | 11/2001 |
| JP | H02-139328 A | 5/1990 |
| JP | H07-040518 | 2/1995 |
| JP | H08-254956 A | 10/1996 |
| JP | 2005-345793 A | 12/2005 |
| JP | 2006-176591 | 7/2006 |
| JP | 3858113 | 12/2006 |
| JP | 2008-001051 A | 1/2008 |
| JP | 2008-231171 | 10/2008 |
| JP | 2009-040038 | 2/2009 |
| JP | 5859230 | 2/2016 |
| JP | 2017-167474 | 9/2017 |

(Continued)

OTHER PUBLICATIONS

N,N-Ethylenebis(stearamide) compound summary from PubChem, National Library of Medicine (Year: 2024).*
EESR issued in EP Patent Application No. 19776396.4, Nov. 24, 2021.
Office Action issued in TW Patent Application No. 108111176, May 2, 2022, translation.
Office Action issued in CN Patent Application No. 201980022406.0, Dec. 20, 2021, translation.
Office Action issued in JP Patent Application No. 2020-511103, Jun. 8, 2021, English translation.
Examination Report issued in IN Patent Application No. 202017040333, Jan. 29, 2021.

(Continued)

Primary Examiner — Anish P Desai
(74) Attorney, Agent, or Firm — GREENBLUM & BERNSTEIN, P.L.C.

(57) ABSTRACT

A laminate including at least a heat-sensitive adhesive layer, a substrate layer, and a protective layer in this order, wherein the substrate layer has a thermoplastic resin film, the heat-sensitive adhesive layer contains a higher fatty acid amide, and the protective layer contains a silicone-based release agent. An in-mold label comprising this laminate. A molded body obtained by affixing this in-mold label. An in-mold label in the form of a roll obtained by winding this in-mold label. This invention provides an in-mold label that is less susceptible to dirt and scratches, excellent in decorativeness and visibility, less likely to cause friction when the labels are stacked on each other, and easy to handle, and has strong adhesive strength to a molded body.

14 Claims, No Drawings

(56) References Cited

FOREIGN PATENT DOCUMENTS

| | | |
|---|---|---|
| KR | 10-0648026 B | 11/2006 |
| WO | 2011/046126 | 4/2011 |
| WO | WO-2015182435 A1 * | 12/2015 ............... B31D 1/02 |
| WO | WO-2016133012 A1 * | 8/2016 ............. B29C 49/24 |

OTHER PUBLICATIONS

Office Action issued in KR Patent Application No. 10-2020-7030183, Oct. 20, 2021, translation.
International Search Report and Written Opinion, WIPO, Application No. PCT/JP2019/014046, dated Jun. 11, 2019, English translation.
International Preliminary on Patentability, WIPO, Application No. PCT/JP2019/014046, dated Oct. 6, 2020, English translation.

* cited by examiner

LAMINATE, IN-MOLD LABEL, LABELED MOLDED BODY, ROLLED IN-MOLD LABEL, AND STACKED IN-MOLD LABELS

TECHNICAL FIELD

The present invention relates to an in-mold label and a laminate preferred for an in-mold label, and a labeled molded body using the in-mold label. The present invention particularly relates to an in-mold label that is less susceptible to dirt and scratches, excellent in decorativeness and visibility, less likely to cause friction when the labels are stacked on each other, and easy to handle, and has strong adhesive strength to a molded body.

BACKGROUND ART

An in-mold label is a label that has a substrate layer and a heat-sensitive adhesive layer, and is attached to a mold for resin molding with the heat-sensitive adhesive layer on the cavity side, and thus is substantially integrated with a molded body and appears to be printed directly on the molded body. In-mold labels are widely used as labels for molded bodies in the form of containers, for example, containers used in wet areas, such as those for shampoos and detergents, and containers for frozen foods, dairy products, and the like.

Here, in an in-mold label, usually, a design such as letters or a pattern is printed on the substrate layer by offset printing, gravure printing, or the like (see Patent Literature 1). A protective layer may be provided on the substrate layer of an in-mold label in order to protect its surface.

CITATION LIST

Patent Literature

Patent Literature 1: Japanese Patent Laid-Open No. 8-254956

SUMMARY OF INVENTION

Technical Problem

As described above, an in-mold label on which a protective layer is provided is known. However, the performance of the protective layer of an in-mold label has not been sufficiently studied so far.

Therefore, the present inventors have formed protective layers having various compositions and examined their performance as protective layers for in-mold labels. It has become clear that none can be said to be sufficiently satisfactory as protective layers for in-mold labels. For example, when an overprint varnish (OP varnish for short) comprising a photocurable acrylic resin as a main material is applied and provided as a protective layer, the decorativeness (so-called glazing), the hardness, and the surface smoothness improve, but a problem is that the coefficient of friction when the in-mold labels are in contact with each other increases, and so-called simultaneously taking or conveying two in which a plurality of in-mold labels are supplied and conveyed overlapping occur easily during label conveyance.

The present invention has been made in view of such present circumstances for in-mold labels. Specifically, it is an object to provide an in-mold label that is less susceptible to dirt and scratches, excellent in decorativeness and visibility, less likely to cause friction when the labels are stacked on each other, and easy to handle, and has strong adhesive strength to a molded body, a laminate useful as an in-mold label, and in-mold labels in the form of a roll and an in-mold label stack. Further, it is an object to provide a labeled molded body in which the label portion is less susceptible to dirt and scratches, the decorativeness and the visibility are excellent, and the label is less likely to peel.

Solution to Problem

In order to decrease the trouble during label conveyance as described above, the present inventors have paid attention to the type of the protective layer and the composition of the heat-sensitive adhesive layer and studied. As a result, it has become clear that by using a protective layer in which an organosilicon compound (silicone-based release agent) is blended, the trouble during label conveyance can be reduced. However, when the silicone-based release agent has been blended into the protective layer, the problem of a decrease in the adhesive strength of the in-mold label to a molded body has occurred on the other hand. Therefore, the present inventors have further studied this decrease in adhesive strength due to the use of the silicone-based release agent. The present inventors have obtained findings that the trouble during label conveyance is suppressed, and the adhesive strength of the label to a molded body can also be ensured by combining a heat-sensitive adhesive layer in which a higher fatty acid amide is blended, with a protective layer in which a silicone-based release agent is blended. The present invention has been proposed based on these findings and specifically has the following configurations.

[1] A laminate comprising at least a heat-sensitive adhesive layer, a substrate layer, and a protective layer in this order, wherein the substrate layer has a thermoplastic resin film, the heat-sensitive adhesive layer contains a higher fatty acid amide, and the protective layer contains a silicone-based release agent.
[2] The laminate according to [1], wherein the higher fatty acid amide includes a monoamide.
[3] The laminate according to [1], wherein the higher fatty acid amide includes a substituted amide.
[4] An in-mold label comprising the laminate according to any of [1] to [3].
[5] The in-mold label according to [4], having an internal haze of 50% or less.
[6] A labeled molded body obtained by affixing a label to a molded body by an in-mold labelling method, wherein the label is the in-mold label according to [4] or [5].
[7] The labeled molded body according to [6], wherein the molded body is made of polyester.
[8] The labeled molded body according to [6] or [7], wherein the molded body is a molded body in the form of a container.
[9] An in-mold label in the form of a roll obtained by winding the in-mold label according to [4] or [5].
[10] An in-mold label stack obtained by stacking two or more of the in-mold labels according to [4] or [5].

Advantageous Effects of Invention

According to the present invention, it is possible to provide an in-mold label that is less susceptible to dirt and scratches, excellent in decorativeness and visibility, less likely to cause friction when the labels are stacked on each other, and easy to handle, and has strong adhesive strength to a molded body. By using the in-mold label of the present invention, it is possible to realize a labeled molded body in which the label portion is less susceptible to dirt and scratches, the decorativeness and the visibility are excellent, and the label is less likely to peel.

DESCRIPTION OF EMBODIMENTS

Embodiments of the present invention will be described in detail below, but the description of configuration requirements described below provides examples of embodiments of the present invention, and the present invention is not limited to the following description unless departing from the spirit thereof. When the expression "to" is used herein, it is used as an expression including numerical values or physical property values before and after it. As used herein, a "main component" refers to a component whose content in a composition is more than 50%.

<Laminate>

The laminate of the present invention has at least a heat-sensitive adhesive layer, a substrate layer, and a protective layer in this order, wherein the substrate layer has a thermoplastic resin film, the heat-sensitive adhesive layer contains a higher fatty acid amide, and the protective layer contains a silicone-based release agent. The laminate of the present invention has the protective layer containing the silicone-based release agent, and thus has high hardness, is less susceptible to dirt and scratches, and is excellent in decorativeness and surface smoothness. In addition, the coefficient of friction in a state in which the laminates are in contact with each other is low, the occurrence of the simultaneously taking or conveying two laminates from a contact state is suppressed, and the handleability is good. Further, the heat-sensitive adhesive layer contains the higher fatty acid amide, and thus the laminate of the present invention can be adhered to a molded body with high adhesive strength by in-mold molding even if the protective layer contains the silicone-based release agent. This is presumed to be for the following reason.

The present inventors provided a protective layer containing a silicone-based release agent on a laminate. The excellent effects as described above were obtained, but on the other hand, a phenomenon in which the adhesive strength to a molded body, as an in-mold label, decreased was seen. This decrease in adhesive strength was studied in detail, including the layer configuration of the laminate, the compositions of the layers, the manufacturing method and the manufacturing conditions, and the conveyance method. As a result, it became clear that particularly when the protective layers and the heat-sensitive adhesive layers of the laminates were placed in a state of being in contact with each other, during the manufacture, conveyance, or storage of the laminates, a phenomenon in which the adhesive strength as in-mold labels decreased appeared. Therefore, the laminates were superposed to bring the protective layer and the heat-sensitive adhesive layer into contact with each other, and then the surface Si atom concentration of the protective layer and the heat-sensitive adhesive layer was measured. The presence of Si atoms was noted on the surface of the heat-sensitive adhesive layer. From this, it was convinced that the silicone-based release agent in the protective layer was transferred to the surface of the heat-sensitive adhesive layer by the contact between the protective layer and the heat-sensitive adhesive layer, and this decreased the adhesive strength of the heat-sensitive adhesive layer to a molded body.

Further, studies were performed in order to overcome such a decrease in adhesive strength. It was found that when a higher fatty acid amide was contained in the heat-sensitive adhesive layer, the laminate adhered to a molded body with sufficient adhesive strength even when the laminate was subjected to in-mold molding after the protective layer and the heat-sensitive adhesive layer were brought into contact with each other. This was presumed to be because the higher fatty acid amide in the heat-sensitive adhesive layer had the action of suppressing the transfer of the silicone-based release agent from the protective layer to the heat-sensitive adhesive layer.

From the above, in the laminate of the present invention, the protective layer contains the silicone-based release agent, and thus the following effects are obtained: the laminate of the present invention is less susceptible to dirt and scratches, excellent in decorativeness and surface smoothness, less likely to cause friction when the laminates are stacked on each other, and easy to handle. In addition, the heat-sensitive adhesive layer contains the higher fatty acid amide, and thus the laminate of the present invention can be adhered to a molded body with strong adhesive strength by in-mold molding. Therefore, the laminate of the present invention can be effectively used as an in-mold label.

The layers constituting the laminate of the present invention will be described below.

[Substrate Layer]

The substrate layer used in the laminate of the present invention has a thermoplastic resin film.

(Thermoplastic Resin Film)

The thermoplastic resin film used for the substrate layer functions as a support supporting the layers constituting the laminate. The thermoplastic resin film should be one having such strength and thickness that functions as a support. The thermoplastic resin film is not particularly limited, but preferably has stiffness (resilience) to the extent that handling properties are obtained during printing and in insertion into a mold as an in-mold label.

(Thermoplastic Resin)

Examples of the thermoplastic resin used in the thermoplastic resin film include olefin-based resins such as polypropylene-based resins, polymethyl-1-pentene, and ethylene-cyclic olefin copolymers; polyester-based resins such as polyethylene terephthalate resins and polybutylene terephthalate resins; polyvinyl chloride resins; polyamide-based resins such as nylon-6, nylon-6,6, nylon-6,10, and nylon-6, 12; polystyrene; and polycarbonates. Among these, the thermoplastic resin used in the thermoplastic resin film preferably includes a polypropylene-based resin or a polyethylene terephthalate resin as the main component and more preferably includes a polypropylene-based resin as the main component, from the viewpoint of the simplicity of manufacture. Two or more of these thermoplastic resins may be used together in any combination and ratio.

From the viewpoint of making a difference in melting point from the heat-sensitive adhesive layer and not causing unnecessary deformation of the thermoplastic resin film during in-mold molding, the thermoplastic resin contained in the thermoplastic resin film is preferably a thermoplastic resin having a melting point 15° C. or higher than the melting point of the heat-seal resin contained in the heat-sensitive adhesive layer. Specifically a thermoplastic resin having a melting point in the range of 130 to 280° C. is preferred.

Examples of thermoplastic resin films preferred for the laminate of the present invention include polypropylene-based unstretched films (CPP films), polypropylene-based biaxially stretched films (BOPP films), polyethylene terephthalate-based unstretched films (CPET films), and polyethylene terephthalate-based biaxially stretched films (BOPET films). The laminate of the present invention is preferably transparent as described later. Therefore, the thermoplastic resin film used for the substrate layer is also preferably transparent, and a transparent CPP film, a transparent BOPP film, a transparent CPET film, a transparent BOPET film, and the like are particularly preferably used for the thermoplastic resin film.

When two or more types of thermoplastic resins are contained in the thermoplastic resin film used for the substrate layer, the one whose content is 50% by mass or more based on the total mass of the thermoplastic resins is preferably a thermoplastic resin illustrated above.

(Filler)

The thermoplastic resin film used for the substrate layer may contain an organic filler and/or an inorganic filler. In this case, the filler contained in the thermoplastic resin film may be only an organic filler or only an inorganic filler or may be a combination of an organic filler and an inorganic filler.

When the thermoplastic resin film contains a filler, the thermoplastic resin film containing the filler can be made white and opaque by stretching. By using the thermoplastic resin film made white and opaque for the substrate layer, the laminate can be subjected to printing in a color that stands out against a white background, to increase the visibility of printing.

When the thermoplastic resin film comprises no filler, or the content of the filler is low, the substrate layer is easily uniformly molded when the laminate is manufactured, and the transparency of the laminate increases. Thus, in a labeled molded body using the laminate as an in-mold label, the label is inconspicuous, and visibility as if printing were performed directly on the molded body can be obtained.

Whether a filler is added to the thermoplastic resin film or not, and further the content of the filler in the thermoplastic resin film are preferably appropriately selected according to the designability required of the laminate of the present invention and an in-mold label comprising the laminate, and the like.

However, advantages of the laminate of the present invention are that it is excellent in moldability, and when it is adhered to a molded body, the outer shape is inconspicuous, and visibility as if printing were performed directly on the molded body can be exhibited. Therefore, in order to exploit such merits, the laminate of the present invention is preferably made transparent and used, and the thermoplastic resin film is also preferably transparent. Therefore, it is preferred that the thermoplastic resin film comprises no filler, or the content of the filler is low.

Examples of the inorganic filler used in the thermoplastic resin film include calcium carbonate (preferably heavy calcium carbonate), calcined clay, silica, diatomaceous earth, white clay, talc, titanium oxide (preferably rutile type titanium dioxide), barium sulfate, alumina, zeolite, mica, sericite, bentonite, sepiolite, vermiculite, dolomite, wollastonite, and glass fibers. The inorganic filler may have its surface surface-treated with a fatty acid or the like. Two or more of these inorganic fillers may be used together in any combination and ratio.

For the organic filler, a resin filler including a resin whose melting point or glass transition point is higher than that of the thermoplastic resin (the thermoplastic resin as a matrix in which the filler is dispersed) forming the thermoplastic resin film can be used.

When the thermoplastic resin contained in the thermoplastic resin film is a propylene-based resin, the melting point or glass transition point of the organic filler is preferably 120 to 300° C. Specific examples of preferred organic fillers include polyethylene terephthalate, polyethylene naphthalate, polybutylene terephthalate, polyamides, polycarbonates, polystyrene, cyclic olefin homopolymers, ethylene-cyclic olefin copolymers, polyethylene sulfide, polyimides, polymethacrylates, polyethyl ether ketone, polyphenylene sulfide, and melamine resins. Two or more of these organic fillers may be used together in any combination and ratio.

The content of the filler in the thermoplastic resin film is preferably 10% by mass or more, more preferably 15% by mass or more, based on the total mass of the components constituting the thermoplastic resin film. Thereby, the thermoplastic resin film is white and opaque and can increase the visibility of printing in a color that stands out against a white background. The content of the filler in the thermoplastic resin film is preferably 70% by mass or less, more preferably 60% by mass or less, and further preferably 50% by mass or less based on the total mass of the components constituting the thermoplastic resin film. Thereby, the thermoplastic resin film is easily uniformly molded, and the label is inconspicuous, and visibility as if printing were performed directly on a molded body can be obtained.

(Other Components)

Components such as an antioxidant such as a sterically hindered phenol-based, phosphorus-based, amine-based, or sulfur-based antioxidant; a light stabilizer such as a sterically hindered amine-based, benzotriazole-based, or benzophenone-based light stabilizer; a dispersing agent, or an antistatic agent may be contained in the thermoplastic resin film used for the substrate layer, according to the required physical properties. When these components are contained in the thermoplastic resin film, the content of each component is preferably 0.001 to 1% by mass based on the total mass of the components constituting the thermoplastic resin film.

(Layer Configuration)

The thermoplastic resin film used for the substrate layer may have a single-layer configuration or a multilayer configuration comprising two or more layers. When the substrate layer has a multilayer configuration, the moldability of the laminate, and the like can be improved.

[Protective Layer]

In the laminate of the present invention, the protective layer contains a silicone-based release agent and is provided on one side of the substrate layer.

The "silicone-based release agent" in the present invention refers to a release agent containing a polymer compound having a plurality of siloxane bonds in the main chain (an organosilicon compound, a so-called silicone).

The laminate of the present invention comprises the protective layer containing the silicone-based release agent, and thus has high hardness, is less susceptible to dirt and scratches, and is excellent in decorativeness and surface smoothness. In addition, the coefficient of friction when the laminates are in contact with each other is low, the taking or conveying two labels are less likely to occur during the conveyance of labels as in-mold labels, and handling is easy.

As specific examples of the silicone-based release agent, condensation reaction type silicones such as both-end silanol-functional long-chain dimethylsiloxane; addition reaction type silicones such as linear methylvinylpolysiloxane having vinyl groups at both ends or at both ends and in side chains; ultraviolet curable silicones such as silicones having acryloyl groups; and the like can be illustrated. Two or more of these silicone-based release agents may be used together in any combination and ratio.

The protective layer is preferably formed by an coating method using a coating material containing a silicone-based release agent. As the coating material containing a silicone-based release agent, an overprint varnish (OP varnish) containing a silicone-based release agent can be preferably used. Here, the "OP varnish" is generally a coating material having high transparency used for the purpose of protecting the surface of a printed material, and is coated to a substrate surface and then cured by irradiation with visible light or ultraviolet rays, oxidative polymerization, or the like to form a film. The protective layer coating material used for the formation of the protective layer may be one prepared by mixing components for preparing an OP varnish, and a silicone-based release agent in the desired proportion, an OP varnish containing a commercial silicone-based release agent, or one prepared by mixing a material containing a silicone-based release agent into a commercial OP varnish containing no silicone-based release agent. Among these, one prepared by mixing a material containing a silicone-based release agent into a commercial OP varnish containing no silicone-based release agent is preferably used because the concentration of the silicone-based release agent can be arbitrarily adjusted.

An OP varnish, which contains a silicone-based release agent and can be cured by visible light or ultraviolet rays, can usually be obtained by mixing 0.5 to 3 parts by mass of a crosslinking agent, 1 to 5 parts by mass of a photoreaction initiator, and a silicone-based release agent into 100 parts by mass of a mixture of 40 to 80% by mass of a radical-reactive monomer and 20 to 60% by mass of a polymer having a radical-reactive group.

Examples of commercial products of OP varnishes, which can be cured by visible light or ultraviolet rays, can include "L Carton OP Varnish KS" and "UV Flexo TH-3" manufactured by T&K TOKA CO., LTD. These are both OP varnishes containing no silicone-based release agent. Therefore, by mixing a material containing a silicone-based release agent into these OP varnishes, protective layer coating materials containing a silicone-based release agent can be prepared.

An OP varnish, which contains a silicone-based release agent and can be cured by oxidative polymerization or the like, can usually be obtained by mixing a silicone-based release agent into a so-called oily OP varnish obtained by mixing 50 to 250 parts by mass of a solvent component such as mineral oils, vegetable oils, alcohols such as 2-propanol, esters such as propyl acetate, and aliphatic hydrocarbons such as methylcyclohexane into 100 parts by mass of a mixture obtained by mixing 1 to 20% by mass of a cellulose derivative, vinyl chloride, a vinyl acetate copolymer, or the like into 80 to 99% by mass of a urethane resin, a phenol maleic acid resin, or the like as a resin component.

The thickness of the protective layer is preferably 0.5 μm or more, more preferably 1 μm or more. Thereby, the strength of the laminate increases, dirt and scratches are easily prevented, and a smoother surface can be obtained. The thickness of the protective layer is preferably 50 μm or less, more preferably 30 μm or less. Thus, a protective layer having a high degree of cure is easily obtained.

The thickness of the protective layer can be measured by cross-sectional observation by a scanning electron microscope. For details of the thickness measurement method, the description in the (Thickness of Label and Each Layer) section in Examples described later can be referred to.

The protective layer may be a single layer or have a multilayer configuration including two or more layers. When the protective layer has a multilayer configuration, its total thickness is preferably in the above-described range. When the protective layer according to the present invention has a multilayer configuration, a silicone-based release agent is preferably contained in at least the protective layer constituting the outermost surface. Specifically, for example, a layer containing a silicone-based release agent may be formed on a layer comprising no silicone-based release agent to constitute a protective layer.

[Heat-Sensitive Adhesive Layer]

In the laminate of the present invention, the heat-sensitive adhesive layer contains a higher fatty acid amide and is provided on the side of the substrate layer opposite to the protective layer.

When the laminate of the present invention as an in-mold label is affixed to a molded body such as a container, the heat-sensitive adhesive layer functions as an adhesive adhering the laminate (label) and the molded body to each other. Specifically, the heat-sensitive adhesive layer contains a heat-seal resin, and melts by the heat of a parison (molding resin) in a mold for in-mold molding and then is cooled to solidify to adhere the laminate and the molded body to each other.

In the laminate of the present invention, particularly, the heat-sensitive adhesive layer contains the higher fatty acid amide, and thus even if the laminates are stacked, and the heat-sensitive adhesive layer comes into contact with the protective layer containing the silicone-based release agent, the transfer of the silicone-based release agent from the protective layer to the heat-sensitive adhesive layer is suppressed. Thereby, in subsequent in-mold molding, the heat sealability of the heat-sensitive adhesive layer can act effectively to adhere the laminate and a molded body to each other with strong adhesive strength.

(Higher Fatty Acid Amide)

The higher fatty acid amide used in the heat-sensitive adhesive layer in the present invention has a fatty acid amide structure in which the hydroxyl group of a higher fatty acid is replaced by a substituted or unsubstituted amino group. In the following description, the remaining moiety obtained by removing the substituted or unsubstituted amino group from this fatty acid amide structure is referred to as a fatty acid group.

The number of carbon atoms of the fatty acid group of the higher fatty acid amide contained in the heat-sensitive adhesive layer is preferably 8 or more, more preferably 10 or more. Thereby, the stickiness of the higher fatty acid amide at room temperature can be suppressed. The number of carbon atoms of the fatty acid group of the higher fatty acid amide is preferably 54 or less, more preferably 40 or less. Thus, the heat sealability of the heat-sensitive adhesive layer can be maintained. When the higher fatty acid amide is the following bisamide, the total of the number of carbon atoms of the first fatty acid group and the second fatty acid group is preferably "the number of carbon atoms of the fatty acid group of the higher fatty acid amide" here.

As the higher fatty acid amide, for example, a monoamide, a substituted amide, and a bisamide can be used.

Monoamide

A monoamide is a higher fatty acid amide having one fatty acid amide structure including an amino group and a fatty acid group, and can also be referred to as a hydrocarbon having an amide group ($-CO-NH_2$). Here, in the hydrocarbon moiety, at least one hydrogen atom may be replaced by a substituent. By using a monoamide as the higher fatty acid amide, better adhesive strength to a molded body tends to be obtained.

The hydrocarbon group in the fatty acid group may be either a saturated hydrocarbon group or an unsaturated hydrocarbon group, but is preferably an unsaturated hydrocarbon group from the viewpoint of adhesive strength. By introducing a double bond into the hydrocarbon group, the molecular structure of the higher fatty acid amide can be bent to suppress crystallization, and higher heat sealability tends to be obtained. The number of double bonds in the hydrocarbon group is not particularly limited but is preferably 1 or more. The number of double bonds is also preferably 6 or less, more preferably 3 or less, and further preferably 2 or less. The number of carbon atoms of the fatty acid group in the monoamide is preferably 14 to 25 when the fatty acid group has a double bond.

Substituted Amide

A substituted amide is a higher fatty acid amide having a structure in which at least one of the two hydrogen atoms of an amide group in a monoamide is replaced by a substituent, and preferably has a structure in which one of the two hydrogen atoms of the amide group is replaced by a substituent. By using a substituted amide as the higher fatty acid amide, the stickiness of the heat-sensitive adhesive layer can be suppressed, sticking to peripheral apparatuses and the like when the heat-sensitive adhesive layer is laminated on the substrate layer is prevented, and so on, allowing more stable manufacture of the laminate.

Examples of the substituent replacing a hydrogen atom of the amide group (hereinafter referred to as "the substituent of the amide group") include a hydrocarbon group. The hydrocarbon group may be either a saturated hydrocarbon group or an unsaturated hydrocarbon group, and at least one hydrogen atom may be replaced by a substituent.

The number of carbon atoms of the hydrocarbon group as the substituent is preferably 8 or more, more preferably 10 or more, and further preferably 14 or more. The number of carbon atoms is also preferably 54 or less, more preferably 30 or less, and further preferably 25 or less. The number of carbon atoms of the fatty acid group in the substituted amide is preferably 14 to 25 when the fatty acid group has a double bond.

The number of carbon atoms of the substituent of the amide group ($C_1$) is preferably such a number that the ratio of the number of carbon atoms of the substituent of the amide group ($C_1$) to the number of carbon atoms of the fatty acid group ($C_2$) ($C_1/C_2$) is in the range of 0.05 to 5.0. Further, this ratio of the number of carbon atoms ($C_1/C_2$) is more preferably in the range of 0.10 to 0.95 or 1.05 to 4.5, further preferably in the range of 0.2 to 0.9 or 1.1 to 4.0. When the ratio of the number of carbon atoms ($C_1/C_2$) is within the above range, the symmetry of the molecular structure of the higher fatty acid amide can be decreased to suppress crystallization, and a decrease in heat sealability tends to be able to be suppressed.

The degree of unsaturation of the substituent of the amide group ($HD_1$) and the degree of unsaturation of the fatty acid group ($HD_2$) are preferably different from each other, and it is more preferred that the absolute value of the difference between these ($|HD_1-HD_2|$) is 1.0 or more. By introducing a double bond into the molecule, the molecular structure of the higher fatty acid amide can be bent. Further, when $HD_1$ and $HD_2$ are different from each other, the symmetry of the molecular structure can be decreased. As a result, the crystallization of the higher fatty acid amide is suppressed, and higher heat sealability tends to be obtained. Here, the degrees of unsaturation $HD_1$ and $HD_2$ are each a value (degree of unsaturation HD) obtained by the following formula (1) for the hydrocarbon group as the substituent, or the hydrocarbon group in the fatty acid group.

$$HD=(2\times N_C+2-N_H-N_X-N_N)/2 \quad \text{formula (1)}$$

wherein $N_C$, $N_H$, $N_X$, and $N_N$ each represent the number of atomic species constituting the hydrocarbon group, and $N_C$ is the number of carbon atoms, $N_H$ is the number of hydrogen atoms, $N_X$ is the number of halogen atoms, and $N_N$ is the number of nitrogen atoms.

Specifically, the degree of unsaturation of the substituent of the amide group ($HD_1$) is preferably 0.5 or more. The degree of unsaturation ($HD_1$) is also preferably 8 or less, more preferably 5 or less, and further preferably 2 or less. The degree of unsaturation of the fatty acid group ($HD_2$) is preferably 0.5 or more. The degree of unsaturation ($HD_2$) is also preferably 8 or less, more preferably 5 or less, and further preferably 2 or less.

Bisamide

A bisamide is a higher fatty acid amide having a structure in which two monoamides are linked via a linking group. More particularly, a bisamide has a structure in which in each of two monoamides, one hydrogen atom of its amide group is replaced by a common linking group, and thereby these monoamides are linked to each other. In the following description, the fatty acid group of one of two monoamides forming a bisamide is referred to as a "first fatty acid group", and the fatty acid group of the other is referred to as a "second fatty acid group". The first fatty acid group and the second fatty acid group may be the same or different from each other.

Examples of the linking group include a divalent hydrocarbon group, and the number of carbon atoms thereof is preferably 1 to 6, more preferably 1 to 3.

The ratio of the number of carbon atoms of the first fatty acid group ($C_3$) to the number of carbon atoms of the second fatty acid group ($C_4$) ($C_3/C_4$) in the bisamide is preferably in the range of 0.05 to 5.0, more preferably in the range of 0.10 to 0.95 or 1.05 to 4.5, and further preferably in the range of 0.2 to 0.9 or 1.1 to 4.0. When the ratio of the number of carbon atoms ($C_3/C_4$) is within the above range, the symmetry of the molecular structure of the higher fatty acid amide can be decreased to suppress crystallization, and a decrease in heat sealability tends to be able to be suppressed.

The degree of unsaturation of the first fatty acid group ($HD_3$) and the degree of unsaturation of the second fatty acid group ($HD_4$) in the bisamide are preferably different from each other, and it is more preferred that the absolute value of the difference between these ($|HD_3-HD_4|$) is 1.0 or more. By introducing a double bond into the molecule, the molecular structure of the higher fatty acid amide can be bent. Further, when $HD_3$ and $HD_4$ are different from each other, the symmetry of the molecular structure can be decreased. As a result, the crystallization of the higher fatty acid amide is suppressed, and higher heat sealability tends to be obtained.

Here, the degrees of unsaturation $HD_3$ and $HD_4$ are each a value (degree of unsaturation HD) obtained by the above formula (1) for the hydrocarbon group in the first fatty acid group, or the hydrocarbon group in the second fatty acid group.

Specifically, the degree of unsaturation of the first fatty acid group ($HD_3$) is preferably 0.5 or more. The degree of unsaturation ($HD_3$) is also preferably 8 or less, more preferably 5 or less, and further preferably 2 or less. The degree of unsaturation of the second fatty acid group ($HD_4$) is preferably 0.5 or more. The degree of unsaturation ($HD_4$) is also preferably 8 or less, more preferably 5 or less, and further preferably 2 or less.

The higher fatty acid amide used in the heat-sensitive adhesive layer is preferably the above saturated fatty acid monoamide, unsaturated fatty acid monoamide, saturated substituted amide, unsaturated substituted amide, saturated fatty acid bisamide, or unsaturated fatty acid bisamide.

Examples of the higher fatty acid amide contained in the heat-sensitive adhesive layer preferably include monoamides such as oleic acid amide, stearic acid amide, erucic acid amide and behenic acid amide, substituted amides such as N-stearylstearic acid amide, N-methylolacrylamide and N-stearylerucic acid amide, and bisamides such as N,N-methylenebisoleic acid amide, N,N-ethylenebisoleic acid amide and hexamethylenebisstearic acid amide, the higher fatty acid amid more preferably includes bisamides such as N,N-methylenebisoleic acid amide and N,N-ethylenebisoleic acid amide, N-stearylerucic acid amide, or erucic acid amide, and further preferably includes N-stearylerucic acid amide or erucic acid amide.

Here, the higher fatty acid amide used in the heat-sensitive adhesive layer may be one type, or two or more types may be combined and used.

The content of the higher fatty acid amide in the heat-sensitive adhesive layer is preferably 0.03% by mass or more, more preferably 0.05% by mass or more, based on the total mass of the components constituting the heat-sensitive adhesive layer. The content of the higher fatty acid amide in the heat-sensitive adhesive layer is preferably 3% by mass or less, more preferably 1% by mass or less, based on the total mass of the components constituting the heat-sensitive adhesive layer. Thereby, the laminate and a molded body can be adhered to each other with higher adhesive strength in either of in-mold molding before the heat-sensitive adhesive layer is placed in a contact state with the protective layer, and in-mold molding after the heat-sensitive adhesive layer is placed in a contact state with the protective layer.

(Heat-Seal Resin)

For the heat-seal resin used in the heat-sensitive adhesive layer, heat-seal resins used in known in-mold labels can be used. The heat-seal resin is preferably olefin-based resins because they are excellent in molding processability, low cost, transparency, the ease of control of flexibility, heat resistance, and chemical resistance.

Examples of olefin-based resins preferred as the heat-seal resin include homopolymers and copolymers of olefins, and copolymers formed from olefins and other comonomers. Specific examples of the olefins include ethylene and propylene. Of these, ethylene is preferred because a moderate degree of crystallinity is easily obtained, and the heat sealability is easily adjusted. For the heat-seal resin, copolymers formed from ethylene and other comonomers are preferred because the adhesive strength to a molded body when the laminate of the present invention is affixed to the molded body as an in-mold label increases easily.

Examples of another comonomer used in the heat-seal resin include alkenes, vinyl acetate, acrylic acid, methacrylic acid, alkyl acrylate esters, alkyl methacrylate esters, and maleic anhydride. Among these, alkyl methacrylate esters are preferred, alkyl methacrylate esters in which the number of carbon atoms of the alkyl group is 1 to 8 are more preferred, alkyl methacrylate esters in which the number of carbon atoms of the alkyl group is 1 to 3 are further preferred, and methyl methacrylate ester is most preferred, because adhesive strength to a molded body made of polyester, particularly heat sealability even at low temperature, is exhibited. In other words, as the heat-seal resin used in the heat-sensitive adhesive layer, ethylene-methyl methacrylate copolymers are particularly preferred.

The melting point of the heat-seal resin is preferably 60° C. or more, more preferably 70° C. or more, and further preferably 75° C. or more. Thus, the blocking of the laminates with each other is less likely to occur. The melting point of the heat-seal resin is preferably 110° C. or less, more preferably 100° C. or less, and further preferably 90° C. or less. Thus, during in-mold molding, the heat-seal resin melts easily, and the adhesive strength is easily increased.

(Other Components)

The heat-sensitive adhesive layer may contain known resin additives other than a heat-seal resin and a higher fatty acid amide in a range that does not significantly impair the heat sealability. Examples of the resin additives include tackifiers, waxes, and antiblocking agents.

Examples of the tackifiers include rosins and derivatives thereof, terpenes and derivatives thereof, petroleum resins, and hydrogenated products thereof. Examples of the waxes include paraffin waxes, microcrystalline waxes, carnauba wax, and Fischer Tropsch wax. Examples of the antiblocking agents include inorganic powders such as silica, talc, and zeolite.

These additives can each usually be used in the range of 0.01 to 5% by mass based on the total mass of the components constituting the heat-sensitive adhesive layer.

(Thickness)

The thickness of the heat-sensitive adhesive layer is preferably 0.05 µm or more, more preferably 0.1 µm or more, further preferably 1.0 µm or more, particularly preferably 1.5 µm or more, and particularly more preferably 5 µm or more. Thereby, the adhesive strength when the laminate of the present invention is adhered to a molded body as an in-mold label can be made higher. The thickness of the heat-sensitive adhesive layer is preferably 40 µm or less, more preferably 30 µm or less, further preferably 20 µm or less, and particularly preferably 10 µm or less. Thereby, the material cost of the in-mold label can be kept low.

The thickness of the heat-sensitive adhesive layer can be measured by cross-sectional observation by a scanning electron microscope. For details of the thickness measurement method, the description in the (Thickness of Label and Each Layer) section in Examples described later can be referred to.

[Printing and Decoration]

In the laminate of the present invention, the side of the substrate layer on which the heat-sensitive adhesive layer is not provided can be subjected to printing. Examples of the printing method include various known printing methods such as gravure printing, offset printing, flexographic printing, seal printing, and screen printing. Examples of the printed information include bar codes, manufacturers, sales company names, characters, trade names, and usage.

The laminate of the present invention may be subjected to decoration such as transfer foil and a hologram. Security elements such as threads are also included in decoration. The laminate of the present invention may be subjected to both printing and decoration.

When the laminate and in-mold label of the present invention are subjected to printing or decoration, the protective layer is usually laminated on a surface subjected to printing or decoration after the substrate layer is subjected to them.

[Physical Properties of Laminate]
(Surface Si Atom Concentration)

The "surface Si atom concentration" herein refers to the Si atom concentration of a layer surface measured by X-ray photoelectron spectroscopy. These Si atoms are mainly derived from the silicone-based release agent contained in the protective layer, or the silicone-based release agent transferred from the protective layer to the heat-sensitive adhesive layer.

The surface Si atom concentration in the protective layer is preferably 3 atm % or more, more preferably 5 atm % or more. Thereby, the friction when the laminates are stacked on each other can be more effectively suppressed. The surface Si atom concentration in the protective layer is preferably 25 atm % or less, more preferably 20 atm % or less. Thereby, even after the laminates are stacked on each other, the adhesive strength between the laminate and a molded body in in-mold molding can be made higher.

The surface Si atom concentration in the heat-sensitive adhesive layer is preferably 9 atm % or less, more preferably 5 atm % or less. Thereby, even after the laminates are stacked on each other, the adhesive strength between the laminate and a molded body in in-mold molding can be made higher. When the silicone-based release agent is transferred from the protective layer to the heat-sensitive adhesive layer by contact with the protective layer, the lower limit of the surface Si atom concentration of the heat-sensitive adhesive layer is usually 0.4 atm %.

The ratio of the surface Si atom concentration in the heat-sensitive adhesive layer ($C_{sih}$) to the surface Si atom concentration in the protective layer ($C_{sip}$) ($C_{sih}/C_{sip}$) is preferably small. Thereby, friction is less likely to occur when the laminates are stacked on each other, and the adhesive strength between the laminate and a molded body in in-mold molding can be increased. Specifically, the ratio of the surface Si atom concentration of the heat-sensitive adhesive layer to the surface Si atom concentration of the protective layer ($C_{sih}/C_{sip}$) is preferably 0.5 or less, more preferably 0.3 or less. The lower limit value of the surface Si atom concentration ratio ($C_{sih}/C_{sip}$) also depends on the above lower limit of the surface Si atom concentration in the heat-sensitive adhesive layer and may be 0.001 or more, 0.01 or more, or 0.05 or more.

In the laminate of the present invention, the surface Si atom concentration of the protective layer ($C_{sip}$), the surface Si atom concentration of the heat-sensitive adhesive layer ($C_{sih}$), and the ratio of the surface Si atom concentration of the heat-sensitive adhesive layer to the surface Si atom concentration of the protective layer ($C_{sih}/C_{sip}$) are preferably in the above-described ranges even after a contact test in which two laminates are brought into contact with each other under predetermined conditions.

Here, the contact test means that two laminates are stacked so that the protective layer of one and the heat-sensitive adhesive layer of the other are in contact with each other, and maintained at 40° C. for 3 minutes with a pressure of 2.5 Mpa applied.

For the laminate in which the surface Si atom concentration of the protective layer and the heat-sensitive adhesive layer and the surface Si atom concentration ratio ($C_{sih}/C_{sip}$) are in the above-described ranges after this contact test, even when the laminates are stacked on each other, and the heat-sensitive adhesive layer is placed in a state of being in contact with the protective layer containing the silicone-based release agent, practical adhesive strength can be obtained between the laminate and a molded body.

(Transparency)

The laminate of the present invention is preferably transparent because it is easily uniformly molded during manufacture, and in a labeled molded body in which the laminate is affixed to a molded body as an in-mold label, the label is inconspicuous, and visibility as if printing were performed directly on the molded body can be exhibited. Specifically, in the laminate, the opacity measured in accordance with JIS P 8149: 2000 "Paper and board—Determination of opacity (paper backing)—Diffuse reflectance method" is preferably 50% or less, more preferably 25% or less. The lower limit of this opacity is usually 3%. In the laminate, the internal haze measured in accordance with JIS-K-7136 is preferably 50% or less, more preferably 25% or less, and further preferably 15% or less. The lower limit of the internal haze is usually 3%.

[Performance of Laminate as in-Mold Label]

The laminate of the present invention can be effectively used as an in-mold label. In order to perform in-mold molding using the laminate of the present invention as an in-mold label, the laminate is attached to a mold so that the heat-sensitive adhesive layer side is on the cavity side of the mold, and a molding resin is introduced into the mold, heated, and then cooled. Thereby, the molding resin is molded, and the laminate (in-mold label) and the molded body adhere to each other, and a labeled molded body is obtained. The performance of the laminate of the present invention as an in-mold label will be described below. In the description in this section, the "laminate" of the present invention is sometimes referred to as an "in-mold label".

(Adhesive Strength)

As used herein, the "adhesive strength" of the in-mold label to a molded body refers to adhesive strength measured according to JIS K6854-2: 1999 "Adhesives—Determination of peel strength of bonded assemblies—Part 2: 180° peel".

The adhesive strength of the in-mold label to a molded body is preferably 100 gf/15 mm or more, more preferably 200 gf/15 mm or more. The upper limit of the adhesive strength of the in-mold label to a molded body is not particularly limited. However, the adhesive strength is preferably 2500 gf/15 mm or less because cohesive failure is less likely to occur in any layer of the label.

(Coefficients of Friction)

As used herein, the "coefficients of friction" between the heat-sensitive adhesive layer and the protective layer of the in-mold labels refer to coefficients of friction measured in accordance with JIS-K-7125. Specifically, the coefficients of friction (the coefficient of kinetic friction and the coefficient of static friction) are measured, for example, using a friction measuring machine "TR-2" manufactured by Toyo Seiki Seisaku-sho, Ltd., and using a 200 g sled under the conditions of load cell: 1 kgf and moving speed: 150 mm/min.

For the in-mold label of the present invention, the coefficient of kinetic friction between the heat-sensitive adhesive layer and the protective layer is preferably 0.2 or more. For the in-mold label of the present invention, the coefficient of kinetic friction between the heat-sensitive adhesive layer and the protective layer is preferably 1.2 or less. For the in-mold label of the present invention, the coefficient of static friction between the heat-sensitive adhesive layer and the protective layer is preferably 0.2 or more. For the in-mold label of the present invention, the coefficient of static friction between the heat-sensitive adhesive layer and the protective layer is preferably 1.2 or less. When the coefficient of kinetic friction and the coefficient of static friction are equal to or more than the above lower limit value, the occurrence of paper feed trouble due to label sliding can be suppressed during offset printing. When the coefficient of kinetic friction and the coefficient of static friction are equal to or less than the above upper limit value, the occurrence of paper feed trouble due to insufficient slide properties of the label can be suppressed during printing.

[Printing Durability]

In the laminate of the present invention, for example, the side of the substrate layer opposite to the heat-sensitive adhesive layer can be subjected to printing. Here, the protective layer containing the silicone-based release agent is provided on the side of the substrate layer opposite to the heat-sensitive adhesive layer in this laminate, and thus the durability of printing when the laminate is subjected to printing is excellent. Specifically, even if the protective layer side of the laminate of the present invention is subjected to a abrasion test or ink adhesiveness evaluation by tape peeling, the printing is less likely to be abraded, and the ink is less likely to peel, and high printing durability is obtained.

[Method for Manufacturing Laminate]

The laminate of the present invention can be manufactured by laminating a heat-sensitive adhesive layer on one surface side of a substrate layer and laminating a protective layer on the other surface side.

Examples of the method for molding a single-layer film as a substrate layer include extrusion molding (cast molding) by a T-die, inflation molding by an O-die, and calendar molding by a rolling roll. Examples of the method for molding a multilayer film as a substrate layer include a manufacturing method using a T-die or an O-die having a multilayer die configuration. Specific examples include a method of supplying thermoplastic resin compositions used for layers to extruders, supplying the molten thermoplastic resin compositions discharged from the extruders to a multilayer die, laminating the thermoplastic resin compositions in the die, and discharging the laminate in the form of a film. The substrate layer can also be manufactured by extrusion-laminating a thermoplastic resin composition on a single-layer or multilayer sheet.

Examples of the method for laminating a heat-sensitive adhesive layer on a substrate layer include a coextrusion method, an extrusion lamination method, an application method, and a film bonding method. The coextrusion method is a method of supplying a thermoplastic composition for a substrate layer and a thermoplastic composition for a heat-sensitive adhesive layer (a plurality of types may be used for each) to a multilayer die, laminating the thermoplastic compositions in the multilayer die, and extruding the laminate, and lamination is performed at the same time as molding. The extrusion lamination method is a method of laminating a molten thermoplastic composition for a heat-sensitive adhesive layer on a previously molded substrate layer, and nipping the laminate with a roll with cooling, and molding and lamination are performed in separate steps. The application method is a method of applying an application liquid containing a thermoplastic composition for a heat-sensitive adhesive layer to a previously molded substrate layer, and includes a solvent application method and an aqueous application method. The film bonding method is a method of molding each of a substrate layer and a heat-sensitive adhesive layer into a film, and bonding both via a pressure-sensitive adhesive, and molding and lamination are performed in separate steps. Among these lamination methods, the coextrusion method is preferred from the viewpoint of being able to strongly adhere the layers to each other.

As the method for laminating a protective layer on a substrate layer, a protective layer is preferably provided by an application method because it is simple, and a protective layer material having any composition is easily prepared from a commercial product and the like.

<In-Mold Label>

Next, the in-mold label of the present invention will be described.

The in-mold label of the present invention comprises at least a heat-sensitive adhesive layer, a substrate layer, and a protective layer in this order, wherein the substrate layer has a thermoplastic resin film, the heat-sensitive adhesive layer contains a higher fatty acid amide, and the protective layer contains a silicone-based release agent. For description, preferred ranges, and specific examples of the layers, the corresponding description in the <Laminate> section can be referred to with "laminate" read as "in-mold label".

The in-mold label of the present invention comprises the protective layer containing the silicone-based release agent, and thus the hardness increases, the protective layer surface is less susceptible to dirt and scratches, and the decorativeness and the surface smoothness are excellent, as described in the <Laminate> section. In addition, the following effect is also obtained: the coefficient of friction in a state in which the laminates are in contact with each other is low, and handling is easy. Further, in the in-mold label of the present invention, the heat-sensitive adhesive layer contains the higher fatty acid amide, and thus even when the protective layer and the heat-sensitive adhesive layer are placed in a state of being in contact with each other, the transfer of the silicone-based release agent from the protective layer to the heat-sensitive adhesive layer is suppressed, and the in-mold label can be adhered to a molded body with high adhesive strength due to the heat sealability of the heat-sensitive adhesive layer.

<In-Mold Labels in Form of Roll and in-Mold Label Stack>

Next, the in-mold labels in the form of a roll according to the present invention and the in-mold label stack of the present invention will be described.

The in-mold labels in the form of a roll according to the present invention is obtained by winding the in-mold labels of the present invention.

The in-mold label stack of the present invention is obtained by stacking two or more of the in-mold labels of the present invention. The in-mold label stack of the present invention is a bundle of two or more of the in-mold labels of the present invention and is so-called columnar stacking in the printing industry.

For description, preferred ranges, and specific examples of the in-mold label of the present invention used in the in-mold labels in the form of a roll according to the present invention and the in-mold label stack of the present invention, the corresponding description in the <Laminate> and <In-Mold Label> sections can be referred to.

These forms (roll form and stacked form) of the in-mold labels are useful as the forms of products when the manufactured in-mold labels are stored, distributed, and sold. Of these forms, from the viewpoint of productivity, the form of the in-mold labels in the form of a roll is preferably adopted. When the amount of the in-mold labels produced is small, the form of the in-mold label stack is preferably adopted because it can be simply formed.

Here, in both the in-mold labels in the form of a roll according to the present invention and the in-mold label stack of the present invention, the protective layers and the heat-sensitive adhesive layers of the in-mold labels are placed in a state of being in contact with each other. Specifically, in the in-mold labels in the form of a roll, a protective layer (or heat-sensitive adhesive layer) on an inner circumference is in contact with the heat-sensitive adhesive layer (or protective layer) on the next circumference, and in the in-mold label stack, the protective layer (or heat-sensitive adhesive layer) of a lower in-mold label is in contact with the heat-sensitive adhesive layer (or protective layer) of the in-mold label placed thereon. At this time, in the in-mold label of the present invention, the silicone-based release agent is contained in the protective layer, and thus the friction of the labels against each other is less likely to occur. Therefore, these forms are easily formed, and the labels can be easily taken out from these forms and subjected to in-mold molding. In addition, the heat-sensitive layer contains the higher fatty acid amide, and thus the transfer of the silicone-based release agent contained in the protective layer to the heat-sensitive adhesive layer is suppressed. Therefore, in in-mold molding, the heat sealability of the heat-sensitive adhesive layer can act effectively to adhere the in-mold label and a molded body to each other with high adhesive strength. As a result, a labeled molded body in which the label surface is less susceptible to dirt and scratches, the decorativeness and the visibility are excellent, the label is less likely to peel, and the practicality is excellent can be obtained.

<Labeled Molded Body>

Next, the labeled molded body of the present invention will be described.

The labeled molded body of the present invention is a labeled molded body obtained by affixing a label to a molded body by an in-mold labelling method, wherein the label is the in-mold label of the present invention. Examples of a preferred shape of the molded body can include one in the form of a container.

For description, preferred ranges, and specific examples of the in-mold label of the present invention, the corresponding description in the <Laminate> and <In-Mold Label> sections can be referred to.

(In-Mold Labelling Method)

The "in-mold labelling method" in the present invention refers to a method of molding a molding resin into the shape of a mold, and affixing the in-mold label of the present invention to the molded body molded, by in-mold molding.

The labeled molded body according to the in-mold labelling method can be manufactured, for example, by the following steps.

First, the in-mold label of the present invention is attached to the inside of a mold so that the heat-sensitive adhesive layer side is on the cavity side of the mold. Next, a heated and melted molding resin is injected into the mold, and the heat-sensitive adhesive layer of the in-mold label is melted by contact with the molding resin. Then, the molding resin and the heat-sensitive adhesive layer are solidified by cooling. Thus, the molding resin is fixed in the shape of the mold, and a molded body is formed, and at the same time, the label is adhered to the molded body, and a labeled molded body is obtained.

Preferred examples of the in-mold molding method used in the present invention include a stretch blow molding method, a direct blow molding method, an injection molding method, and a differential pressure molding method.

(Material of Molded Body)

The material of the molded body used in the labeled molded body of the present invention is not particularly limited as long as it is a material that can be molded by the in-mold labelling method. For example, thermoplastic resins can be used. Specific examples can include polar resins such as polyester-based resins such as polyethylene terephthalate, polybutylene terephthalate, polybutylene succinate, and polylactic acid, and copolymers thereof; polycarbonate-based resins; acrylonitrile-styrene resins; acrylonitrile-butadiene-styrene resins; and methyl methacrylate-styrene resins; and nonpolar resins such as polyolefin-based resins such as polypropylene and polyethylene. Among these, polyester-based resins are preferred, and polyethylene terephthalate is more preferred, because stretch blow molding is easily performed, and shrinkage deformation after molding is small.

EXAMPLES

The features of the present invention will be more specifically described below by giving Examples and Comparative Examples. However, the materials, amounts used, proportions, treatment details, treatment procedures, and the like shown in the Examples can be appropriately changed without departing from the spirit of the present invention. In other words, the scope of the present invention should not be construed in a limiting manner by the Examples and the like shown below.

[Evaluation Methods]

The evaluation methods performed in the present Examples are shown below.

(Thickness of Label and Each Layer)

The thickness of a laminate (in-mold label) (total thickness) was measured in accordance with JIS K7130: 1999 using a constant pressure thickness gauge (manufactured by TECLOCK, model name: PG-01J). The thickness of each layer of the laminate was calculated by estimating the relative thickness of each layer to the thickness of the laminate (total thickness) by cross-sectional observation by a scanning electron microscope, and multiplying the thickness of the laminate (total thickness) by this relative thickness of each layer. The cross-sectional observation sample was fabricated by placing the laminate on a glass plate after cooling to −60° C. or less using liquid nitrogen, placing a razor blade (manufactured by Schick Japan K.K., model name: Proline Blade) at right angles, and cutting. The cross-sectional observation of the sample was performed using a scanning electron microscope (manufactured by JEOL Ltd., model name: JSM-6490). The boundary lines between the layers in the in-mold label cross section were determined from the appearance of the cross-sectional shape.

(Contact Test)

The contact test was performed by stacking two laminates so that the protective layer of one and the heat-sensitive adhesive layer of the other were in contact with each other, applying a pressure of 2.5 Mpa, and maintaining the stack at 40° C. for 3 min.

(Surface Si Atom Concentration)

The surface Si atom concentration in a heat-sensitive adhesive layer and a protective layer was measured by X-ray photoelectron spectroscopy (XPS). Specifically, a laminate was punched into such dimensions that it fitted into a sample holder having an aperture diameter of 400 µm, to fabricate three test pieces for XPS measurement for each. Then, the amount of all atoms on the surface of each of the heat-sensitive adhesive layer and the protective layer was measured three times at three points for each test piece using an XPS measuring apparatus (manufactured by Thermo Fisher Scientific K.K., trade name "K-ALPHA"). The proportion of silicon atoms when a measurement result of the amount of all atoms was 100% was calculated, and the average value of calculation results at three points for three times was taken as the Si atom concentration.

This surface Si atom concentration measurement was performed for the laminate after being subjected to the above-described contact test. In other words, after two laminates were stacked so that the protective layer of one and the heat-sensitive adhesive layer of the other were in contact with each other, a pressure of 2.5 Mpa was applied, and the stack was maintained at 40° C. for 3 minutes, the surface Si atom concentration in the heat-sensitive adhesive layer and the protective layer was measured by XPS.
(Transparency)

The transparency of a laminate was measured in accordance with JIS P 8149: 2000 "Paper and board—Determination of opacity (paper backing)—Diffuse reflectance method". Measurement was also performed for internal haze measured in accordance with JIS-K-7136.
(Adhesive Strength)

The adhesive strength of a laminate (in-mold label) to a molded body (a container in the present Examples) was measured according to JIS K6854-2: 1999 "Adhesives—Determination of peel strength of bonded assemblies—Part 2: 180° peel". In the adhesive strength measurement, the adhesive strength was measured after a labeled container fabricated in an Example described later was stored in an environment at 23° C. and a relative humidity of 50% for 2 days.

The adhesive strength of an in-mold label to a container was specifically measured by the following procedure. First, the label-affixed portions of containers were cut off together with the labels by a cutter. From each of two containers, three container sides having a length of 12 cm (9 cm for the label-affixed portion and 3 cm for the unaffixed portion) in the peripheral direction of the body of the container and a width of 1.5 cm (the label was affixed across the full width) in the direction perpendicular to the peripheral direction were cut off. A total of six were cut off. For each of these container sides, 1 cm of the label of the label-affixed portion was peeled from the label-unaffixed portion side in the peripheral direction of the body of the container. The end of this peeled label having a width of 1.5 cm and an end of a PET film having a width of 1.5 cm and a thickness of 50 μm were superposed. The label and the PET film were adhered to each other using a pressure-sensitive adhesive to provide an adhesive strength measurement sample.

A 180° peel test was carried out at a peel speed of 300 mm/min based on JIS K6854-2: 1999 using a tensile tester (manufactured by SHIMADZU CORPORATION, model name: Autograph AGS-5kNJ). Peel force at peel lengths of 25 mm to 75 mm was measured, and the average value was obtained. The value obtained by averaging the average values of the six samples was taken as the adhesive strength. The unit of the adhesive strength was gf/15 mm.
(Coefficients of Friction)

The coefficients of friction between the heat-sensitive adhesive layer and the protective layer of laminates were measured in accordance with JIS-K-7125. Specifically, using a friction measuring machine "TR-2" manufactured by Toyo Seiki Seisaku-sho, Ltd., the measurement of the friction between in-mold labels (the coefficient of static friction and the coefficient of kinetic friction) was measured under the conditions of load cell: 1 kgf and moving speed: 150 mm/min using a 200 g sled.
(Printing Durability)

The printing durability of a laminate was evaluated by performing a tape peel test on the protective layer side of the laminate. Specifically, "CELLOTAPE® CT-18" manufactured by Nichiban Co., Ltd. was stuck to the protective layer side of the laminate and then peeled by hand, and the printing durability of the laminate was evaluated by whether the contents of the printing were transferred to the tape or not.
(Evaluation of Blocking)

For the evaluation of blocking, the blocking was evaluated by pressurizing two laminates superposed so that the heat-sensitive adhesive layer and the protective layer were in contact with each other, to fabricate a blocking evaluation sample, and measuring the force (peel force) required for the peeling of the sample.

Specifically, first, two laminates superposed so that the heat-sensitive adhesive layer and the protective layer were in contact with each other were placed on a silicone mount attached to a heat gradient tester (manufactured by Toyo Seiki: heat gradient tester HG-100-2). Then, pressurization was performed so that a pressure of 1 MPa was applied to the pressurization portion at a temperature of 60° C. for 30 seconds, to fabricate a blocking evaluation sample. At this time, the pressurization area was 10 mm×25 mm. Next, for the fabricated blocking evaluation sample, a 180° peel test was performed at a peel speed of 300 mm/min under conditions in accordance with JIS K6854-2: 1999 using a tensile tester (manufactured by SHIMADZU CORPORATION, model name: Autograph AGS-5kNJ), and the average value of peel force at a peel length of 10 mm was obtained. This average value of peel force was obtained for two samples, and the value obtained by averaging their average values was converted from that for a width of 25 mm to that for a width of 15 mm as blocking strength (gf/15 mm). It is meant that the smaller the blocking strength is, the less blocking is likely to occur.
(Abrasion Test)

For the abrasion test of a laminate, the laminate was attached to a JSPS type friction fastness tester "FR-2" manufactured by Suga Test Instruments Co., Ltd., a friction test in which the protective layer side of the laminate was abraded 100 times with a white cotton cloth moistened with water under a load of 500 g was performed, and the laminate was evaluated by whether the contents of the printing abraded or not.

Example 1

A propylene homopolymer was provided as the material of a substrate layer, and this was melted and kneaded using an extruder heated to 210° C., and then supplied to a two-layer die.

20 parts by mass of polyethylene, 59.4 parts by mass of an ethylene-methyl methacrylate copolymer, 20 parts by mass of a tackifier, and 0.6 parts by mass of a N-stearylerucic acid amide were provided as the material of a heat-sensitive adhesive layer, and these were melted and kneaded using an extruder heated to 150° C., and then supplied to the two-layer die to which the above material of the substrate layer was supplied.

The material of the substrate layer and the material of the heat-sensitive adhesive layer were laminated in the two-layer die and extruded from a T-die as a two-layer film. The extruded two-layer film was conveyed with the substrate layer side of the two-layer film disposed along a metal roll whose temperature was adjusted by cooling water at 40° C., and a Teflon® roll whose temperature was adjusted by cooling water at 35° C. pressed against the heat-sensitive adhesive layer side at a pressure of 0.2 MPa. This was cooled to obtain a laminate having a two-layer structure. In this laminate having a two-layer structure, the thickness of the substrate layer was 77 μm, and the thickness of the heat-sensitive adhesive layer was 10 μm.

An ultraviolet curable OP varnish containing 10% by mass of a silicone-based release agent and an ultraviolet curable OP varnish containing 0.3% by mass of a silicone-based release agent were mixed to prepare a protective layer coating material containing 5% by mass of a silicone-based release agent.

The substrate layer side surface of the previously fabricated laminate having a two-layer structure was subjected to corona discharge treatment with an amount of treatment of 50 kW/m². Then, the protective layer coating material was coated thereto using a rotary press, followed by irradiation with an ultraviolet lamp with an amount of energy of 100 mJ/m² to cure the protective layer to obtain a laminate comprising a heat-sensitive adhesive layer, a substrate layer, and a protective layer in this order. The thickness of the protective layer after the curing was 2 μm.

The internal haze of this laminate was 10%. The abrasion test was performed on the protective layer side of this laminate. As a result, even if the abrasion test was performed, no change was visually noted in the printing.

Example 2

A laminate comprising a heat-sensitive adhesive layer, a substrate layer, and a protective layer in this order was obtained in the same manner as Example 1 except that in the heat-sensitive adhesive layer, the amounts of the ethylene-methacrylate copolymer and N-stearylerucic acid amide blended were changed as shown in Table 1.

Example 3

A laminate comprising a heat-sensitive adhesive layer, a substrate layer, and a protective layer in this order was obtained in the same manner as Example 2 except that in the material of the heat-sensitive adhesive layer, erucic acid amide was used instead of N-stearylerucic acid amide.

Example 4

A laminate comprising a heat-sensitive adhesive layer, a substrate layer, and a protective layer in this order was obtained in the same manner as Example 2 except that in the material of the heat-sensitive adhesive layer, ethylenebisoleic acid amide was used instead of N-stearylerucic acid amide.

Comparative Example 1

A laminate comprising a heat-sensitive adhesive layer, a substrate layer, and a protective layer in this order was obtained in the same manner as Example 1 except that in the material of the heat-sensitive adhesive layer, a low molecular weight polyolefin (EXCEREX 30050B from Mitsui Chemicals, Inc.) was used instead of N-stearylerucic acid amide. The low molecular weight polyolefin used here is a known slip agent.

Comparative Example 2

A laminate comprising a heat-sensitive adhesive layer, a substrate layer, and a protective layer in this order was obtained in the same manner as Example 1 except that the material of the heat-sensitive adhesive layer contained no N-stearylerucic acid amide.

Comparative Example 3

A laminate comprising a heat-sensitive adhesive layer, a substrate layer, and a protective layer in this order was obtained in the same manner as Example 1 except that the material of the heat-sensitive adhesive layer contained no N-stearylerucic acid amide, and an ultraviolet curable OP varnish containing no silicone-based release agent was used instead of the silicone-based release agent-containing ultraviolet curable OP varnish.

The materials of the layers of the laminates fabricated in Examples 1 to 4 and Comparative Examples 1 to 3 are shown together in Table 1.

TABLE 1

| | Substrate layer | Heat-sensitive adhesive layer | Protective layer |
| --- | --- | --- | --- |
| Example 1 | Propylene homopolymer | Polyethylene: 20 parts by mass<br>Ethylene-methacrylate copolymer: 59.4 parts by mass<br>Tackifier: 20 parts by weight<br>N-Stearylerucic acid amide: 0.6 parts by mass | 5% by mass silicone-based release agent-containing ultraviolet curable OP varnish |
| Example 2 | Propylene homopolymer | Polyethylene: 20 parts by mass<br>Ethylene-methacrylate copolymer: 59.7 parts by mass<br>Tackifier: 20 parts by weight<br>N-Stearylerucic acid amide: 0.3 parts by mass | 5% by mass silicone-based release agent-containing ultraviolet curable OP varnish |
| Example 3 | Propylene homopolymer | Polyethylene: 20 parts by mass<br>Ethylene-methacrylate copolymer: 59.7 parts by mass<br>Tackifier: 20 parts by weight<br>Erucic acid amide: 0.3 parts by mass | 5% by mass silicone-based release agent-containing ultraviolet curable OP varnish |
| Example 4 | Propylene homopolymer | Polyethylene: 20 parts by mass<br>Ethylene-methacrylate copolymer: 59.7 parts by mass<br>Tackifier: 20 parts by weight<br>Ethylenebisoleic acid amide: 0.3 parts by mass | 5% by mass silicone-based release agent-containing ultraviolet curable OP varnish |

TABLE 1-continued

| | Substrate layer | Heat-sensitive adhesive layer | Protective layer |
|---|---|---|---|
| Comparative Example 1 | Propylene homopolymer | Polyethylene: 20 parts by mass<br>Ethylene-methacrylate copolymer: 59.4 parts by mass<br>Tackifier: 20 parts by weight<br>Low molecular weight polyolefin (EXCEREX 30050B): 0.6 parts by mass | 5% by mass silicone-based release agent-containing ultraviolet curable OP varnish |
| Comparative Example 2 | Propylene homopolymer | Polyethylene: 20 parts by mass<br>Ethylene-methacrylate copolymer: 59.4 parts by mass<br>Tackifier: 20 parts by weight | 5% by mass silicone-based release agent-containing ultraviolet curable OP varnish |
| Comparative Example 3 | Propylene homopolymer | Polyethylene: 20 parts by mass<br>Ethylene-methacrylate copolymer: 59.4 parts by mass<br>Tackifier: 20 parts by weight | ultraviolet curable OP varnish containingno silicone-based release agent |

(Evaluation 1) Surface Si Atom Concentration after Contact Test

The contact test was performed on each of the laminates fabricated in Examples 1 to 4 and Comparative Examples 1 to 3, and then the surface Si atom concentration in the heat-sensitive adhesive layer and the protective layer was measured by X-ray photoelectron spectroscopy.

(Evaluation 2) Adhesive Strength Before Contact Test

Each of the laminates fabricated in Examples 1 to 4 and Comparative Examples 1 to 3 was punched into a rectangle having a long side of 8 cm and a short side of 6 cm. Using each of these laminates for an in-mold label, a labeled molded body in which the molded body was in the form of a container (hereinafter referred to as a "labeled container") was manufactured in the following steps.

The punched laminate was charged using an electrostatic charging apparatus. The charged laminate was placed in the mold of a stretch blow molding machine ("semiautomatic PET blow molding machine" manufactured by YORKEY CO. LTD.), and then the mold was clamped. Here, the laminate was placed so that the heat-sensitive adhesive layer was on the cavity (hollow) side, and the protective layer was in contact with the mold, and so that the long sides of the laminate in the mold were parallel to the body peripheral direction of the container-forming hollow of the mold. A preform made of polyethylene terephthalate was preheated to 100° C. Then, this preform was injected into the mold in which the previous laminate was placed, and stretch blow molding was performed at a blow pressure of 5 to 40 kg/cm² for 6 seconds. Then, the molded material was cooled to 50° C. in 15 seconds. The mold was opened, and a labeled container having a 7 cm×7 cm square body portion and a height of 12 cm was taken out.

For the taken out labeled container, the adhesive strength of the in-mold label (laminate) to the container was measured.

(Evaluation 3) Adhesive Strength after Contact Test

The contact test was performed on each of the laminates manufactured in Examples 1 to 4 and Comparative Examples 1 to 3. Then, a labeled container was fabricated in the same manner as (Evaluation 2), and the adhesive strength of the in-mold label (laminate) to the container was measured.

(Evaluation 4) Evaluation of Blocking

A blocking evaluation sample was fabricated using each of the laminates manufactured in Examples 1 to 4 and Comparative Examples 1 to 3, and the blocking strength (gf/15 mm) was measured.

(Evaluation 5) Moldability Evaluation

When each of the laminates of Examples 1 to 4 and Comparative Examples 1 to 3 was manufactured, the step of conveying and cooling the two-layer film extruded from the T-die was continued for about 10 min. The surface temperature of the Teflon (Registered Trademark) roll was stable at 80° C. Further, the sticking of the two-layer film (heat-sensitive adhesive layer) to the Teflon (Registered Trademark) roll after a lapse of 20 min was evaluated.

The sticking at each surface temperature was evaluated in the same manner as above except that the temperature of the cooling water passed through the Teflon (Registered Trademark) roll was changed to change the surface temperature of the Teflon (Registered Trademark) roll. The above moldability evaluation was performed on each two-layer film obtained in the manufacturing steps of the laminates of Examples 1 to 4 and Comparative Examples 1 to 3, and the surface temperature at which sticking occurred was evaluated as moldability.

The evaluation results of the surface Si atom concentration in the heat-sensitive adhesive layer ($C_{sih}$) and the surface Si atom concentration in the protective layer after the contact test ($C_{sip}$), their ratio ($C_{sih}/C_{sip}$), the adhesive strength before the contact test, the adhesive strength after the contact test, the retention rate of the adhesive strength after the contact test, the blocking strength in lamination, and the moldability measured for each laminate are shown in Table 2. Here, the retention rate of the adhesive strength after the contact test is a value obtained by the calculation formula: ([adhesive strength after contact test]/[adhesive strength before contact test])×100(%). The surface temperature of the cooling apparatus in the form of a roll for the moldability was changed every 10° C. from 60° C. to 110° C., and when there was no sticking even at 110° C., the moldability was shown as ">110". When there was no sticking at a surface temperature of 80° C., the moldability was determined as excellent.

TABLE 2

| | Surface Si atom concentration of heat-sensitive adhesive layer after contact test $C_{sih}$ (atm %) | Surface Si atom concentration of protective layer after contact test $C_{sip}$ (atm %) | $C_{sih}/C_{sip}$ | Adhesive strength before contact test (gf/15 mm) | Adhesive strength after contact test (gf/15 mm) | Retention rate of adhesive strength after contact test (%) | Blocking strength (gf/15 mm) | Moldability (° C.) |
|---|---|---|---|---|---|---|---|---|
| Example 1 | 1.5 | 18 | 0.08 | 1000 | 600 | 60 | 0 | >110 |
| Example 2 | 3.5 | 18 | 0.19 | 1000 | 300 | 30 | 0 | >110 |
| Example 3 | 2.5 | 18 | 0.14 | 1100 | 350 | 32 | 0 | 100 |
| Example 4 | 5 | 18 | 0.28 | 900 | 250 | 28 | 0 | 90 |
| Comparative Example 1 | 10 | 18 | 0.56 | 1000 | 40 | 4 | 0 | 60 |
| Comparative Example 2 | 9 | 18 | 0.50 | 1000 | 40 | 4 | 0 | 60 |
| Comparative Example 3 | 0 | 0 | 0.00 | 1000 | 1000 | 100 | 60 | >110 |

As shown in Table 2, for all of the laminates of Examples 1 and 2 in which N-stearylerucic acid amide (substituted amide), a higher fatty acid amide, was contained in the heat-sensitive adhesive layer, the laminate of Example 3 in which erucic acid amide (monoamide) was contained in the heat-sensitive adhesive layer, and the laminate of Example 4 in which ethylenebisoleic acid amide (bisamide) was contained in the heat-sensitive adhesive layer, the surface Si atom concentration in the heat-sensitive adhesive layer ($C_{sih}$) was significantly low, and the transfer of the silicone-based release agent from the protective layer to the heat-sensitive adhesive layer was suppressed, compared with the laminate of Comparative Example 2 in which no higher fatty acid amide was contained in the heat-sensitive adhesive layer, and the laminate of Comparative Example 1 in which a known slip agent was used instead of a higher fatty acid amide. For the laminates of Examples 1 to 4, the adhesive strength after the contact test was especially high, compared with the laminates of Comparative Examples 1 and 2. Particularly, for the laminate of Example 3 in which erucic acid amide, a monoamide, was used, the amount of the silicone-based release agent transferred was smaller than that for the laminates of Examples 2 and 4 in which other types of higher fatty acid amides were used in the same amount, and higher adhesive strength was obtained before and after the contact test. From this, it was found that in terms of adhesiveness, particularly monoamides were preferred among higher fatty acid amides.

In addition, as shown in Table 2, for the laminates of Examples 1 to 4, the blocking strength was 0, and blocking was less likely to occur than for the laminate of Comparative Example 3 in which no silicone-based release agent was contained in the protective layer.

Each of the laminates fabricated in Examples 1 to 4 was actually wound in the form of a roll to fabricate in-mold labels in the form of a roll, and the label conveyance properties were evaluated. The labels were smoothly unwound from the roll and travelled without causing problems due to friction.

In addition, each of the laminates fabricated in Examples 1 to 4 was punched into rectangles having a long side of 8 cm and a short side of 6 cm to provide a plurality of small pieces, and 10 of the small pieces were stacked to form an in-mold label stack, and for the in-mold label stack, a test in which labels were taken out one by one was performed. The labels were easily taken out without causing simultaneously taking two.

Further, for each of the laminates fabricated in Examples 1 to 4 and Comparative Examples 1 to 3, the moldability was evaluated. For Examples 1 to 4, in the extrusion molding thereof, even when the surface temperature of the Teflon (Registered Trademark) roll was 80° C. or more, the heat-sensitive adhesive layer was less likely to stick to the peripheral apparatuses and the like, and the molding was performed without causing trouble. Particularly, for Examples 1 and 2 in which N-stearylerucic acid amide, a substituted amide, was used in the heat-sensitive adhesive layer, the sticking of such a heat-sensitive adhesive layer was suppressed even at higher surface temperatures, and the occurrence of trouble at a surface temperature of 80° C. was more stably suppressed, and therefore very good moldability was obtained. From this, it was found that in terms of moldability, particularly substituted amides were preferred among higher fatty acid amides.

In addition, as described above, for the laminate of Example 1, the internal haze was as low as 10%, and no printing deterioration due to the abrasion test was noted. In addition, for these properties, the laminates of Examples 2 to 4 were equivalent to the laminate of Example 1.

From the above results, it was confirmed that for the laminate and in-mold label of the present invention, the transparency was excellent, the printing provided on the label was less likely to be abraded, friction and blocking were less likely to occur when the labels were stacked on each other, handling was easy, and the adhesive strength to a molded body was strong. In addition, it was confirmed that the laminate and in-mold label of the present invention had the heat-sensitive adhesive layer containing the higher fatty acid amide, and therefore even if the heat-sensitive adhesive layer came into contact with the protective layer comprising the silicone-based release agent, practical adhesive strength was maintained.

INDUSTRIAL APPLICABILITY

According to the present invention, it is possible to realize an in-mold label that is less susceptible to dirt and scratches, excellent in decorativeness and visibility, less likely to cause friction when the labels are stacked on each other, and easy to handle, and adheres to a molded body with high adhesive strength by in-mold molding. Thus, the present invention has high industrial applicability.

The invention claimed is:

1. A laminate comprising at least
a heat-sensitive adhesive layer,
a substrate layer, the substrate layer having printing or decoration thereon, and
a protective layer over the printing or decoration,
in this order,
wherein the substrate layer has a thermoplastic resin film, the heat-sensitive adhesive layer contains a higher fatty acid amide, and the protective layer contains a silicone-based release agent;
wherein the laminate satisfies the following condition (a-1):
(a-1) a side of the substrate layer on which the heat-sensitive adhesive layer is not provided is subjected to the printing or decoration;
wherein the higher fatty acid amide is a fatty acid amide having a number of carbon atoms of 8 to 40.

2. The laminate according to claim 1, wherein the higher fatty acid amide includes a monoamide.

3. The laminate according to claim 1, wherein the higher fatty acid amide includes a substituted amide.

4. An in-mold label comprising the laminate according to claim 1.

5. The in-mold label according to claim 4, having an internal haze of 50% or less.

6. A labeled molded body obtained by affixing a label to a molded body by an in-mold labelling method, wherein the label is the in-mold label according to claim 4.

7. The labeled molded body according to claim 6, wherein the molded body is made of polyester.

8. The labeled molded body according to claim 6, wherein the molded body is a molded body in the form of a container.

9. An in-mold label in the form of a roll obtained by winding the in-mold label according to claim 4.

10. An in-mold label stack obtained by stacking two or more of the in-mold labels according to claim 4.

11. The laminate according to claim 1, wherein the heat-sensitive adhesive layer further contains a heat-seal resin, and
the heat-seal resin includes a copolymer formed from ethylene and other comonomer(s), the other comonomer(s) is at least one monomer selected from the group consisting of alkenes, vinyl acetates, acrylic acid, methacrylic acid, alkyl acrylate esters, alkyl methacrylate esters and maleic anhydride.

12. The laminate according to claim 1,
wherein the laminate further satisfies the following conditions (a-2) and (a-3):
(a-2) a thickness of the protective layer is 2 μm to 50 μm, and
(a-3) the protective layer is a cured overprint varnish.

13. The laminate according to claim 1, wherein the laminate further satisfies the following condition (a-2):
(a-2) a thickness of the protective layer is 2 μm to 50 μm.

14. The laminate according to claim 1, wherein the laminate further satisfies the following condition (a-3):
(a-3) the protective layer is a cured overprint varnish.

* * * * *